April 2, 1940.    R. H. TWISS    2,196,043
ELECTRIC SYSTEM OF DISTRIBUTION
Filed June 22, 1939
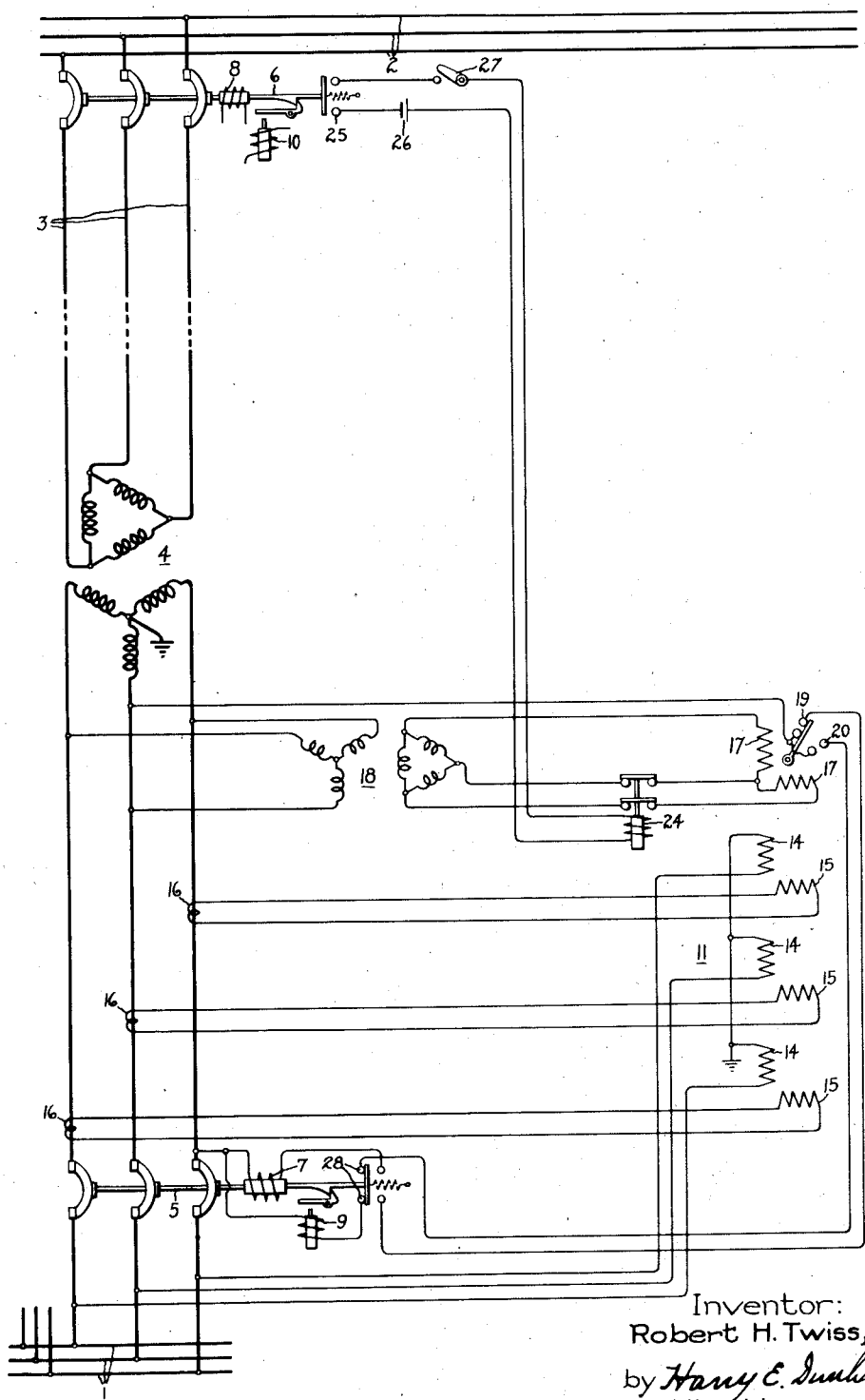
Inventor:
Robert H. Twiss,
by Harry E. Dunham
His Attorney.

Patented Apr. 2, 1940

2,196,043

UNITED STATES PATENT OFFICE 2,196,043

ELECTRIC SYSTEM OF DISTRIBUTION

Robert H. Twiss, East Orange, N. J., assignor to General Electric Company, a corporation of New York Application June 22, 1939, Serial No. 280,531

10 Claims. (Cl. 171—97)

My invention relates to electric systems of distribution and particularly to alternating current distribution systems in which an alternating current network is supplied with current by means of a plurality of feeders containing distribution transformers. In alternating current distribution systems of this type network protectors are provided for controlling the connections between the secondary winding of each transformer and the network. Each network protector includes a network circuit breaker controlled by a power directional relay which is arranged to effect the opening of the network circuit breaker when the power flow from the network to the feeder exceeds a predetermined amount. In order to prevent the circuit breaker from being opened under certain operating conditions which sometimes occur under light load conditions, it is the practice in some installations to desensitize the directional relay by means of a restraining winding which is energized by the network voltage so that the amount of reverse power required to operate the directional relay varies with the network voltage. However, with such an arrangement it is not possible to effect the opening of the network circuit breaker by merely disconnecting the associated feeder from its supply circuit because the reverse magnetizing current of the associated distribution transformer is less than the amount of reverse current required to effect the operation of the directional relay.

One object of my invention is to provide in an alternating current distribution system of the above mentioned type an arrangement for changing the reverse power setting of the directional relay when the associated feeder is disconnected from its supply circuit so that the relay can respond to the reverse magnetizing current in the feeder to effect the opening of the associated network circuit breaker.

My invention will be better understood from the following description when taken in connection with the accompanying drawing which diagrammatically illustrates a system of electric distribution embodying my invention, and its scope will be pointed out in the appended claims.

Referring to the drawing, I represents a low voltage alternating current network which is adapted to be supplied with current from a suitable source of current shown as a supply circuit 2 by means of a plurality of feeders 3 only one of which is shown in the drawing in order to simplify the disclosure. A transformer 4 is provided for supplying current from the feeder 3 to the network 1. The primary winding of the transformer 4 is permanently connected to the feeder 3, and the secondary winding of the transformer is adapted to be connected to the network by suitable switching means 5. The feeder 3 is adapted to be connected to the supply circuit 2 by suitable switching means 6. As shown in the drawing, the switching means 5 and 6 are latched-in circuit breakers and are respectively provided with closing coils 7 and 8 and trip coils 9 and 10.

A power directional relay 11 is provided for controlling the opening of the circuit breaker 5. This power directional relay is connected in any suitable manner to the secondary winding of the transformer 4 so that the relay is energized in accordance with the power flow between the network and the transformer. As shown in the drawing, the relay comprises voltage windings 14 which are connected to be energized from the network side of the circuit breaker 5 and cooperating current windings 15 which are connected to be energized from current transformers 16 on the feeder side of the circuit breaker 5. The relay is also provided with suitable restraining or desensitizing means which is illustrated as two voltage windings 17 energized from the secondary winding of the transformer 4 by means of a potential transformer 18. These restraining windings exert a torque which opposes the torque exerted by the voltage and current windings when power flows from the network to the feeder. Normally the relay 11 is biased so that its closing contacts 19 are closed and its tripping contacts 20 are open. When the current flow from the network 1 to the transformer 4 is above a predetermined amount the relay closes its contacts 20 and opens its contacts 19. In the particular arrangement disclosed in the drawing the amount of reverse current required to cause the relay 11 to open its contacts 19 and close its contacts 20 is greater than the magnetizing current of the transformer 4 so that merely opening the circuit breaker 6 in the feeder 3 does not cause sufficient reverse current to flow to cause the relay 11 to close its contacts 20. A fault on the feeder 3, however, causes sufficient reverse current flow to operate the relay 11 so that it closes its contacts 20.

In accordance with my invention, I provide means whereby the sensitivity of response of the relay 11 can be increased when the circuit breaker 6 is open so that the relay can respond to the reverse magnetizing current of the associated transformer 4 to effect the opening of the associated circuit breaker 5. In the particular embodiment shown in the drawing, this means comprises a pilot circuit which is arranged to be completed through auxiliary contacts 25 on the circuit breaker 6 when it is open and a relay 24 in said pilot circuit, which, when energized, interrupts the circuit of the restraining windings 17 so as to decrease the reverse current setting of the relay 11. Any suitable source of current such as a battery 26 may be included in the pilot circuit for energizing the relay 24 and preferably a suitable control switch 27 is also included in the pilot circuit whereby the pilot circuit may be interrupted even when the switch 6 is open.

The operation of the arrangement shown is as follows:

Normally the reverse current setting of the relay 11 with the restraining windings 17 energized is so high that sufficient current to cause the relay 11 to close its contacts 20 and complete an energizing circuit for the trip coil 9 of the circuit breaker 5 only flows when a fault occurs on the feeder 3. When, however, it is desired to isolate the feeder 3 from the network 1 under normal conditions of the feeder, an energizing circuit for the trip coil 10 of the circuit breaker 6 is completed in any suitable manner so as to open the circuit breaker 6 and disconnect the feeder 3 from the supply circuit 1. When the circuit breaker 6 opens, its auxiliary contacts 25 complete an energizing circuit for the control relay 24 so that it interrupts the circuit of the restraining windings 17 and thereby increases the sensitivity of the relay 11 in order that the reverse magnetizing current supplied from the network 1 to the transformer 4 may cause the relay to close its contacts 20. The closing of the contacts 20 of the relay 11 completes an energizing circuit for the trip coil 9 of the associated circuit breaker 5 through its auxiliary contacts 28 so that it opens and disconnects the feeder 3 from the network 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current network, a feeder circuit, a switch connecting said network to said feeder circuit, power directional means normally responsive to a predetermined amount of power flow from said network to said feeder circuit for controlling the opening of said switch, a second switch in said feeder circuit, means for opening said second switch, a pilot circuit, means for effecting a predetermined change in the energization of said pilot circuit when said second switch is open, and means responsive to said predetermined change in the energization of said pilot circuit for changing the sensitiveness of said power directional means.

2. In combination, an alternating current network, a feeder circuit, a switch connecting said network to said feeder circuit, power directional means normally responsive to a predetermined amount of power flow from said network to said feeder circuit for controlling the opening of said switch, a second switch in said feeder circuit, means for opening said second switch, a normally deenergized pilot circuit, means for energizing said pilot circuit when said second switch is open, and means responsive to the energization of said pilot circuit for changing the sensitiveness of said power directional means.

3. In combination, an alternating current network, a feeder circuit, a switch connecting said network to said feeder circuit, control means for said switch including normally insensitive directional means responsive to the flow of power flow through said switch, a second switch in said feeder circuit, means for opening said second switch, a pilot circuit, means for effecting a change in the energization of said pilot circuit when said second switch is open, and means responsive to said change in the energization of said pilot circuit for increasing the sensitiveness of said directional means to currents of a predetermined direction.

4. In combination, an alternating current network, a feeder circuit, a switch connecting said network to said feeder circuit, control means for said switch including normally insensitive directional means responsive to the flow of power flow through said switch, a second switch in said feeder circuit, means for opening said second switch, a normally deenergized pilot circuit, means responsive to the opening of said second switch for effecting the energization of said pilot circuit, and means responsive to the energization of said pilot circuit for increasing the sensitiveness of said directional means to currents of a predetermined direction.

5. In combination, an alternating current network, a feeder circuit, a switch connecting said network to said feeder circuit, control means for said switch including a power directional relay normally responsive to power flow of more than a predetermined amount from said network to said feeder circuit, a second switch in said feeder circuit, means for opening said second switch, a pilot circuit, means for changing the energization of said pilot circuit in a predetermined manner when said second switch is open, and means responsive to said change in the energization of said pilot circuit for modifying the sensitiveness of said relay so that it responds to a smaller amount of power flow from said network to said feeder circuit.

6. In combination, an alternating current network, a feeder circuit, a switch connecting said network to said feeder circuit, control means for said switch including a power directional relay normally responsive to power flow of more than a predetermined amount from said network to said feeder circuit, a second switch in said feeder circuit, means for opening said second switch, a pilot circuit, means for energizing said pilot circuit when said second switch is open, and means responsive to the energization of said pilot circuit for modifying the sensitiveness of said relay so that it responds to a smaller amount of power flow from said network to said feeder circuit.

7. In combination, an alternating current network, a feeder circuit, a switch connecting said network to said feeder circuit, a supply circuit connected to said feeder circuit, control means for said switch including a power directional relay normally responsive to power flow of more than a predetermined amount from said network to said feeder circuit, means for disconnecting said feeder circuit from said supply circuit and for effecting a change in the energization of said pilot circuit, and means responsive to said change in the energization of said pilot circuit for modifying the sensitiveness of said relay so that it responds to a smaller amount of power flow from said network to said feeder circuit.

8. In combination, an alternating current network, a feeder circuit, a switch connecting said network to said feeder circuit, a supply circuit connected to said feeder circuit, control means for said switch including a power directional relay normally responsive to power flow of more than a predetermined amount from said network to said feeder circuit, means for disconnecting said feeder circuit from said supply circuit and for increasing the energization of said pilot circuit, and means responsive to said increase in the energization of said pilot circuit for modifying the sensitiveness of said relay to the flow of power from said network to said feeder circuit.

9. In combination, an alternating current network, a feeder circuit including a transformer having primary and secondary windings, a switch connecting the secondary winding of said transformer to said network, a supply circuit, a second switch connecting the primary winding of said transformer to said supply circuit, power directional means normally responsive to an amount of power flow from said network to the secondary winding of said transformer in excess of the amount of reverse power flow due to magnetizing said transformer from the network, means controlled by said power directional means for opening said first mentioned switch, means for opening said second switch, a pilot circuit, means responsive to the opening of said first mentioned switch for effecting a predetermined change in the energization of said pilot circuit, and means responsive to said predetermined change in the energization of said pilot circuit for changing the sensitiveness of said power directional means so that it responds to the amount of reverse power supplied to said transformer when said transformer is magnetized from said network.

10. In combination, an alternating current network, a feeder circuit including a transformer having primary and secondary windings, a switch connecting the secondary winding of said transformer to said network, a supply circuit, a second switch connecting the primary winding of said transformer to said supply circuit, power directional means normally responsive to an amount of power flow from said network to the secondary winding of said transformer in excess of the amount of reverse power flow due to magnetizing said transformer from the network, means controlled by said power directional means for opening said first mentioned switch, means for opening said second switch, a normally deenergized pilot circuit, means responsive to the opening of said first mentioned switch for energizing said pilot circuit, and means responsive to the energization of said pilot circuit for changing the sensitiveness of said power directional means so that it responds to the amount of reverse power supplied to said transformer when said transformer is magnetized from said network.

ROBERT H. TWISS.